Feb. 11, 1947.   E. W. M. FAWCETT   2,415,628
PRODUCTION OF BRANCHED CHAIN ALKANES
Filed Oct. 30, 1941
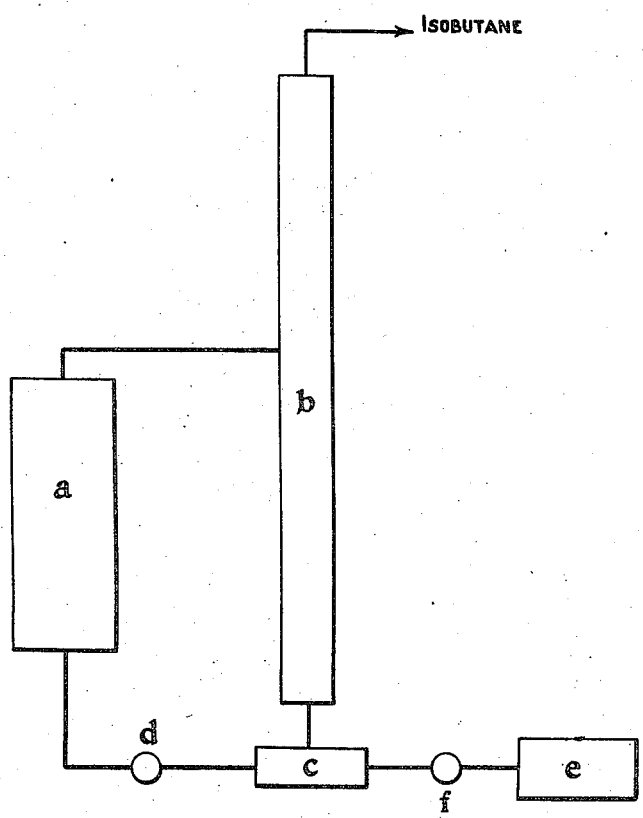
Inventor
E.W.M.Fawcett
by
Morgan Finnegan Durham
Attorneys

UNITED STATES PATENT OFFICE 2,415,628

PRODUCTION OF BRANCHED CHAIN ALKANES

Eric William Musther Fawcett, Sunbury-on-Thames, England, assignor to Anglo-Iranian Oil Company Limited, London, England, a British joint-stock corporation Application October 30, 1941, Serial No. 417,098
In Great Britain October 2, 1940

8 Claims. (Cl. 260—683.5)

This invention relates to a process for the production of branched chain alkanes such as isobutane or isopentane from the corresponding straight chain alkane such as n-butane or n-pentane, or the production of such hydrocarbons from normal hydrocarbons of higher molecular weight such as the production of isobutane from normal pentane or from mixtures of hydrocarbons containing substantial proportions of normal alkanes.

The invention relates to a process in which an aluminium halide, generally aluminium chloride is used as catalyst, carried out in liquid phase and at moderately elevated temperatures of the order of 50–150° C. and under superatmospheric pressures usually of about 10 atmospheres and not exceeding 100 atmospheres.

Inasmuch as the process is to be operated in liquid phase, the minimum pressure requirements may be controlled by the reaction temperature, and no substantial advantage accrues from the use of greater operating pressure than is necessary to maintain the hydrocarbon feedstock in the liquid phase at the reaction temperature.

It is known that the activity of aluminium chloride catalysts for isomerization reactions may be increased in the presence of an activating agent such as hydrogen chloride or water and such an activating agent may advantageously be used. Hydrogen chloride is the preferred activating agent and the concentration preferred lies within the approximate range 0.005 to 1% hydrogen chloride by weight on the hydrocarbon feedstock. The presence of water in appreciable quantities is generally objectionable since although catalyst activity at the outset is attained, reaction between water and aluminium chloride results in the catalyst having a relatively short life. It is therefore desirable that the feedstock be effectively dried, which may be conveniently done by contacting it with an adsorbent such as silica gel or with a dehydrating agent such as concentrated sulphuric acid.

Inasmuch as aluminium chloride is appreciably soluble in liquid hydrocarbons (about 1.86 parts by weight of aluminium chloride dissolves in 100 parts of n-butane at 100° C.), continuous removal of the catalyst from the reaction vessel under the conditions of the process occurs unless the n-butane fed to the reaction system is saturated with aluminium chloride at the reaction temperature.

The present invention has among its purposes to avoid such loss of catalyst from the reaction vessel.

According to the invention, a normal alkane feedstock such as normal butane or n-pentane, (or mixtures of hydrocarbons containing one or more than one normal alkane) is passed through a reaction vessel, heated to isomerization reaction temperature and containing an aluminium halide catalyst, the liquid normal alkane stream entering the reaction vessel being already saturated or substantially saturated with the aluminium halide. The liquid product stream leaving the reaction vessel and containing substantial proportions of the branched chain alkane or alkanes and saturated with the catalyst is passed to the feed point of a fractionating column, from which the branched chain alkanes (or fraction rich in these hydrocarbons) leave as overhead while the unreacted normal alkanes together with the dissolved and/or entrained catalyst leave as bottoms. The normal alkane fraction containing the catalyst is then generally mixed with a further quantity of normal alkane approximately equivalent in amount to the branched chain alkane withdrawn at the head of the fractionating column in order to provide a supply of n-alkane feedstock saturated with aluminium halide for recirculation to the reaction vessel. When employing a catalyst activating agent of a volatile character such as hydrogen chloride, the branched chain alkane fraction leaving the head of the fractionating column will contain the activating agent. This fraction may then be submitted to a fractionation process, usually by distillation, to separate the branched chain alkane and the catalyst activating agent. The activating agent may subsequently be mixed with the normal alkane fraction and recirculated to the reaction vessel.

The invention is applied in a cyclic process in a manner such as hereinafter described with reference to the accompanying drawing which illustrates diagrammatically a continuous flow system for the production of iso-butane from n-butane.

The invention comprises the conditions hereinafter described.

In carrying the invention into effect as illustrated in the accompanying drawing the reaction vessel $a$ is packed with pure aluminium chloride which may be supported on an inert carrier. N-butane or material rich in n-butane is fed at the lower end of the reaction vessel $a$ by means of a pump $d$, and the product stream containing a substantial proportion of isobutane and saturated with aluminium chloride, leaves at the upper end of the reaction vessel $a$ and passes to the feed point of a fractionation column b. From the column b isobutane or a fraction rich in isobutane and free from aluminium chloride is taken overhead, while n-butane or an n-butane rich fraction containing aluminium chloride collects in a closed vessel c, which usually is maintained at a temperature equal to or higher than that of the reaction vessel a. A stream of n-butane derived from the storage tank e equivalent in quantity or approximately equivalent to the isobutane removed at the upper end of the column b, is passed by the pump f to the vessel c. A continuous stream of n-butane or n-butane rich material saturated with aluminium chloride at reaction temperature is thus continuously circulated through the reaction vessel a by the pump d.

The vessel c may in general be of such form and capacity as to ensure rapid saturation with aluminium chloride of the butane stream from the storage tank e.

Such a process may alternatively be carried out upon batches of material in a series of reactors and in the use of a mixture of hydrocarbons or a mixture of normal paraffins other than n-butane.

The following are examples of the conditions under which the process may be applied:

*Example 1.*—In an apparatus such as is diagrammatically shown in the accompanying drawing the reactor is packed with aluminium chloride in lump form (8–10 mesh per inch) at 100° C. and at a pressure of 500 lbs./sq. in., the n-butane circulation being maintained equivalent to a contact time in the reactor of two hours.

In the use of such an apparatus for carrying out the process the product stream leaving the reactor contained for example 22% of isobutane, while the product leaving the column overhead contained 90% of isobutane and 10% n-butane.

*Example 2.*—The reaction vessel containing aluminium chloride in lump form is operated at 110° C. and at a pressure of 600 lbs. per sq. inch. The n-butane feedstock was for example passed at a rate of 1 liquid volume per volume of catalyst per hour and contained .02% by weight of hydrogen chloride. The product leaving the reaction vessel (a) contained about 2% by weight of aluminium chloride and 27.7% of isobutane, and was fed to the fractionating column (b) where an isobutane and hydrogen chloride fraction was taken overhead, and a normal butane and aluminium chloride fraction from the base of the column. The isobutane-hydrogen chloride fraction passed to a second column where separation took place, the hydrogen chloride being re-circulated to the reaction vessel (a), while isobutane in quantity equivalent to .28 volume per volume of catalyst per hour was passed to storage.

The normal butane-aluminium chloride fraction (for example .72 volume per volume catalyst per hour) is admixed with fresh dry normal butane from storage (for example .28 volume per volume catalyst per hour) to provide feedstock saturated with aluminium chloride for re-circulation to the reaction vessel.

I claim:

1. A process for the production at a moderate isomerization reaction temperature of a branched chain alkane product from a normal alkane feedstock in the liquid phase and at a pressure not exceeding 100 atmospheres, comprising first heating the normal alkane feedstock to an elevated temperature at least equal to the isomerization reaction temperature, at least substantially saturating the heated feedstock with an aluminum halide catalyst, then passing the heated saturated normal alkane feedstock and a small proportion of an hydrogen halide catalyst activator to a reaction vessel charged with an aluminum halide catalyst and maintained at said moderate isomerization reaction temperature, converting a substantial proportion of the saturated normal alkane feedstock under the reaction conditions into the desired branched chain alkane product, separating from the resulting reaction mixture saturated with the catalyst a fraction comprising the branched chain alkane product and another fraction comprising unreacted normal alkane with the contained aluminum halide, adding to the unreacted normal alkane fraction recovered, fresh normal alkane feedstock in an amount sufficient to produce a composite feedstock at least substantially saturated with aluminium halide catalyst for recycling in the system, adding to the composite feedstock a small proportion of an hydrogen halide catalyst activator and passing the composite catalyst saturated feedstock to the reaction vessel.

2. A continuous process for the production at a moderate isomerization reaction temperature of a branched chain alkane product from a normal alkane feedstock in the liquid phase, comprising heating the normal alkane feedstock to an elevated temperature at least equal to the isomerization reaction temperature and substantially saturating the heated feedstock with aluminum chloride catalyst, then passing said heated saturated normal alkane feedstock and a small proportion of an hydrogen chloride catalyst activator to a reaction vessel charged with aluminum chloride and maintained at isomerization reaction temperature of the order of 50–150° C. and at a pressure not exceeding 100 atmospheres, converting a substantial proportion of the said saturated heated feedstock under the reaction conditions into the desired branched chain alkane product, passing the resulting reaction mixture saturated with aluminum chloride to a fractionating column, subjecting the reaction mixture to fractionation and separating the desired branched chain alkane product as overhead and the unreacted normal alkane with the contained aluminum chloride as bottoms, and then recycling said bottoms comprised of the unreacted normal alkane with the contained aluminum chloride to said reaction vessel, together with an addition of fresh normal alkane feedstock for at least substantial saturation of the latter at the isomerization reaction temperature, for isomerization and fractionation of the composite feedstock in the system as aforesaid, on addition to the composite feedstock of a further small proportion of an hydrogen chloride catalyst activator.

3. A process as specified in claim 2, in which the branched chain product leaving the fractionating column as overhead is fractionated for the separation as overhead of the hydrogen chloride for recycling and the branched chain alkane product as bottoms.

4. A process as specified in claim 2, in which the normal alkane feedstock is first dried before processing.

5. A process for the production of branched chain alkanes from normal alkanes, in which a composite normal alkane feedstock comprising a proportion of fresh normal alkane feedstock, charged with an aluminum halide catalyst and an hydrogen halide catalyst activator is passed into a reaction chamber charged with aluminum halide catalyst and heated to a moderate isomerization reaction temperature and the desired branched chain alkane product is separated from the resulting reaction mixture, the fresh normal alkane feedstock being first heated within a closed vessel to an elevated temperature at least equal to the isomerization reaction temperature, and at least substantially saturated with an aluminum halide by the addition to the fresh normal alkane feedstock of unreacted normal alkane with contained aluminum halide, recovered by fractionation of the isomerization reaction mixture, whereby the fresh alkane feedstock is composited with unreacted normal alkane and is at least substantially saturated with aluminum halide contained in the unreacted normal alkane, before the admission of the composite normal alkane feedstock into the reaction chamber.

6. A process as specified in claim 2 in which normal butane is the fresh normal alkane feedstock.

7. A process as specified in claim 2 in which normal pentane is the fresh normal alkane feedstock.

8. A continuous process for the production at a moderate isomerization reaction temperature of a branched chain alkane product from a normal alkane feedstock in the liquid phase, comprising heating the normal alkane feedstock to an elevated temperature at least equal to the isomerization reaction temperature and substantially saturating the heated feedstock with aluminum chloride catalyst, then passing said heated saturated normal alkane feedstock and a small proportion of an hydrogen chloride catalyst activator to a reaction vessel charged with aluminum chloride and maintained at isomerization reaction temperature of the order of 50–150° C. and at a pressure not exceeding 100 atmospheres, converting a substantial proportion of the said saturated heated feedstock under the reaction conditions into the desired branched chain alkane product, passing the resulting reaction mixture saturated with aluminum chloride to a fractionating column, subjecting the reaction mixture to fractionation and separating the desired branched chain alkane product as overhead and the unreacted normal alkane with the contained aluminum chloride as bottoms, discharging the said bottoms product from the fractionating column into a closed vessel into which the fresh normal alkane feedstock is also admitted, the amount of the fresh feedstock admitted being approximately equal in quantity to that of the branched chain alkane product withdrawn at the time as overhead from the column, subjecting the resultant composite feedstock in the closed vessel to heat at a temperature at least equal to the reaction temperature, and then recycling the composite feedstock to said reaction vessel for isomerisation and fractionation of the composite feedstock in the system as aforesaid, on addition to the composite feedstock of a further small proportion of an hydrogen chloride catalyst activator.

ERIC WILLIAM MUSTHER FAWCETT.

REFERENCES CITED

The following references are of record in the file of this patent:

UNITED STATES PATENTS

| Number | Name | Date |
|---|---|---|
| 2,268,401 | Kimberlin | Dec. 30, 1941 |
| 2,342,124 | Danforth | Feb. 22, 1944 |
| 2,354,851 | Danforth | Aug. 1, 1944 |
| 2,342,922 | Danforth | Feb. 29, 1944 |

FOREIGN PATENTS

| Number | Country | Date |
|---|---|---|
| 377,663 | Italian | Jan. 2, 1940 |